March 2, 1954
P. I. SCHULTZ
2,670,893
CONTROL MECHANISM
Filed April 19, 1950
3 Sheets-Sheet 1
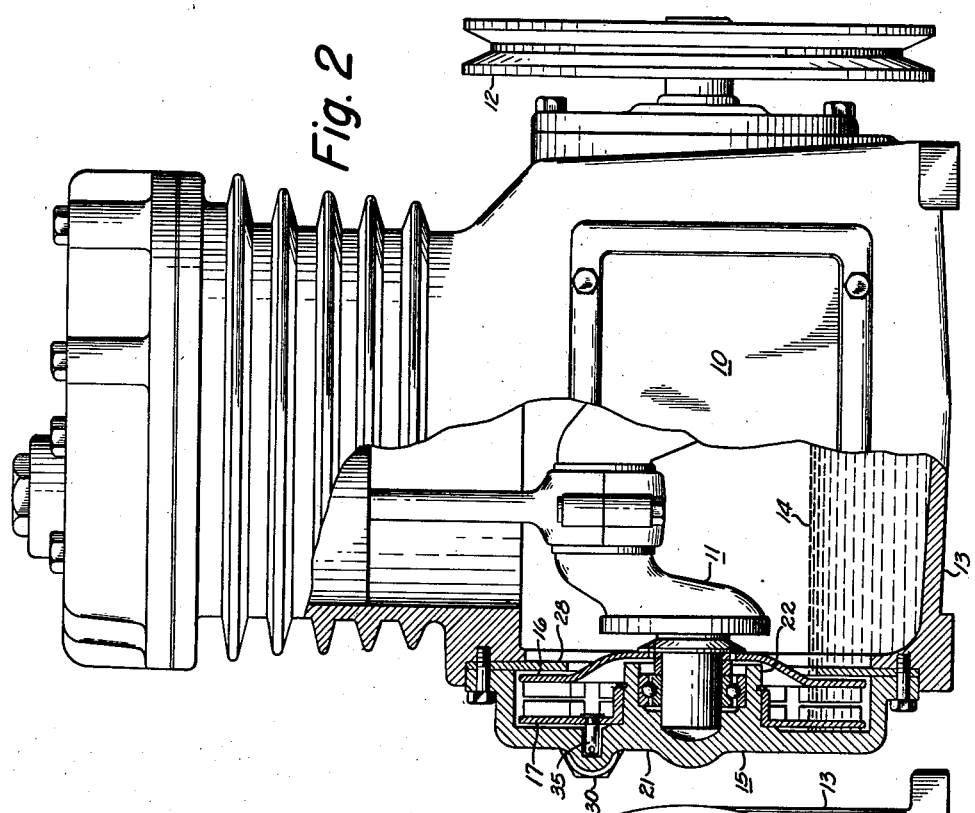
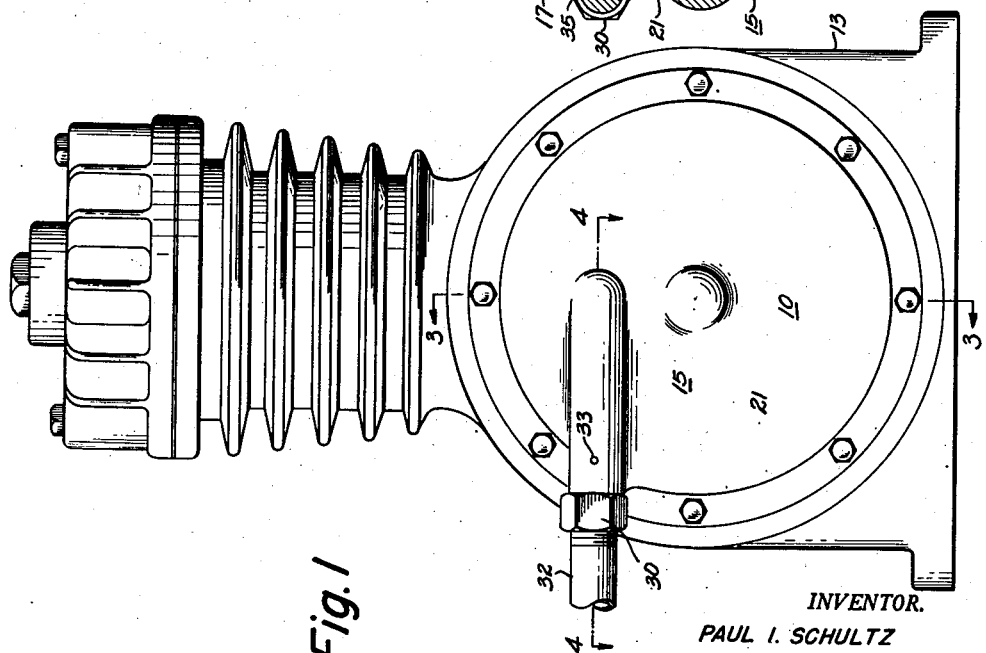
INVENTOR.
PAUL I. SCHULTZ
BY
Woodling and Kroot
his Attys March 2, 1954
P. I. SCHULTZ
2,670,893
CONTROL MECHANISM
Filed April 19, 1950
3 Sheets-Sheet 2
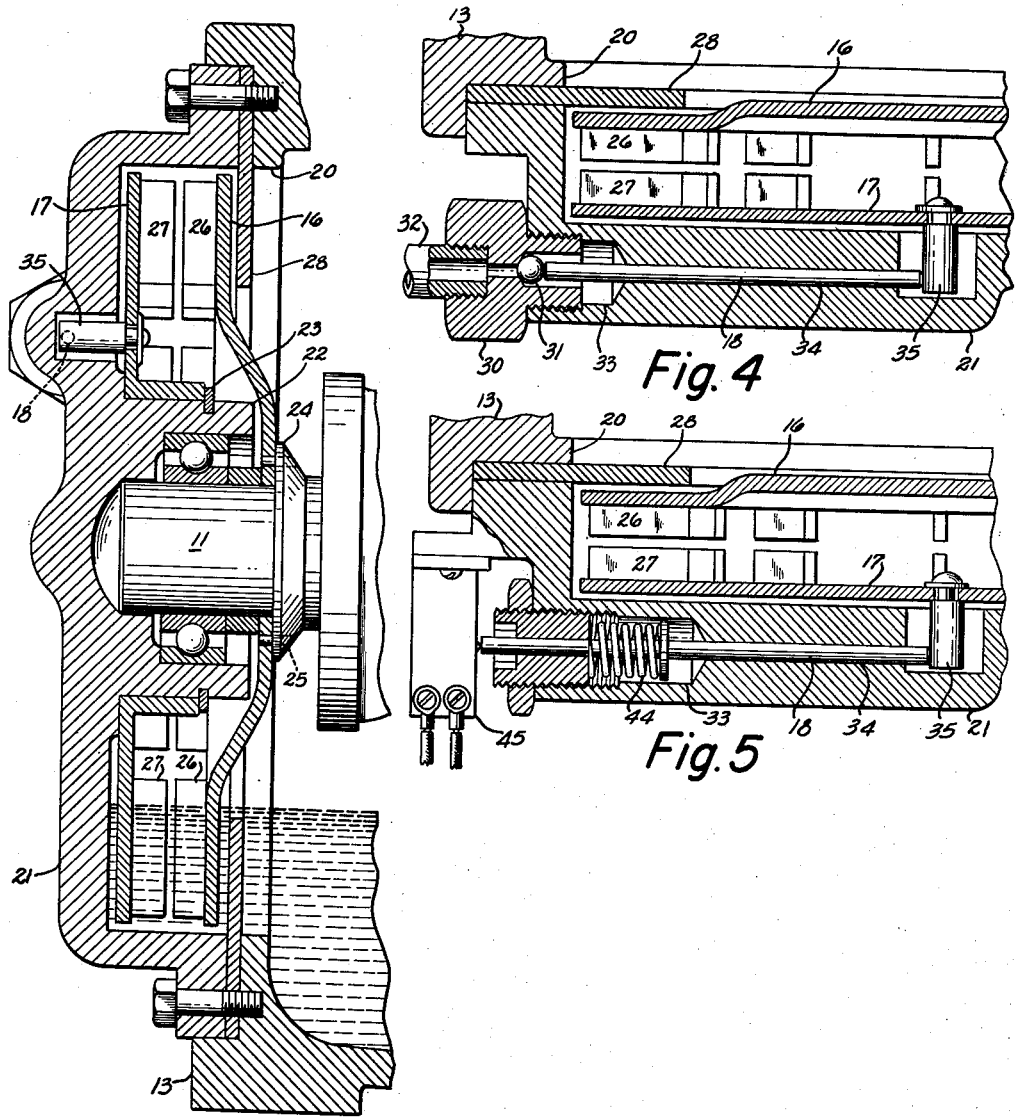
INVENTOR.
PAUL I. SCHULTZ
BY March 2, 1954  P. I. SCHULTZ  2,670,893
CONTROL MECHANISM
Filed April 19, 1950  3 Sheets-Sheet 3

INVENTOR.
PAUL I. SCHULTZ
BY
Woodling and Krost
his attys.

Patented Mar. 2, 1954

2,670,893

UNITED STATES PATENT OFFICE 2,670,893

CONTROL MECHANISM

Paul I. Schultz, Cleveland, Ohio

Application April 19, 1950, Serial No. 156,803

5 Claims. (Cl. 230—29)

The invention relates to a speed responsive device for actuating control mechanisms and in particular to a fluid drive speed and pressure responsive valve actuating mechanism.

An actuating mechanism which is responsive to speed for operating valves or controlling the operation of other similar devices, is very much in demand on many types of machines. One of these machines is an ordinary air compressor such as the one illustrated, described and referred to as a specific example in this application. Although the description and specification use an air compressor as a specific setting for the present invention, it is understood that the scope of the invention is not limited thereby, but that an air compressor is used as a specific example of how the invention operates.

It is generally understood that an air compressor takes in air at atmospheric pressure and pushes it into a storage tank at high pressure. The switching or valve mechanisms cause the air compressor to start at a predetermined low pressure of the tank, which pressure is much higher than atmospheric pressure. If the air were pushed into the tank as soon as the motor of the air compressor started to turn over, there would be a heavy drag and torque required of the motor, which would have a tendency to overload or burn out the motor. To overcome this and to relieve the starting load on the motor, various types of relief valves or unloading devices have been devised, one of which will open the pressure line between the tank and the compressor to atmosphere, until the motor has reached a predetermined speed. It is understood that there is a one-way valve in this line between the compressor and the tank so that air from the tank will not bleed backwards through the line to atmosphere while the motor is coming up to speed. The present invention relates to a device for actuating the relief valve to bleed the compressor feed line to atmosphere until the compressor gets up to operating speed.

One of the objects of my invention is to provide a speed responsive valve actuating mechanism.

Another object of my device is to provide a fluid drive coupling responsive to speed for controlling the operating of a valve.

Another object of my invention is to provide a valve actuating mechanism wherein an impeller drives an impelling member through a fluid coupling for operating a valve mechanism.

Another object of my invention is to provide an air compressor with a fluid drive unit responsive to speed to control the operation of a valve on the compressor.

Other objects and a fuller understanding of this invention may be had by referring to the following description and claims, taken in conjunction with the accompanying drawings, in which:

Figure 1 is an end view of an air compressor having a fluid drive speed responsive device mounted thereon;

Figure 2 is an elevational side view of the air compressor with the fluid drive speed responsive device illustrated in cross-section;

Figure 3 is a fragmentary enlargement along the line 3—3 of Figure 1;

Figure 4 is a fragmentary enlargement along the line 4—4 of Figure 1;

Figure 5 is a fragmentary enlargement similar to Figure 4 but showing the device controlling an electric valve;

Figure 6:
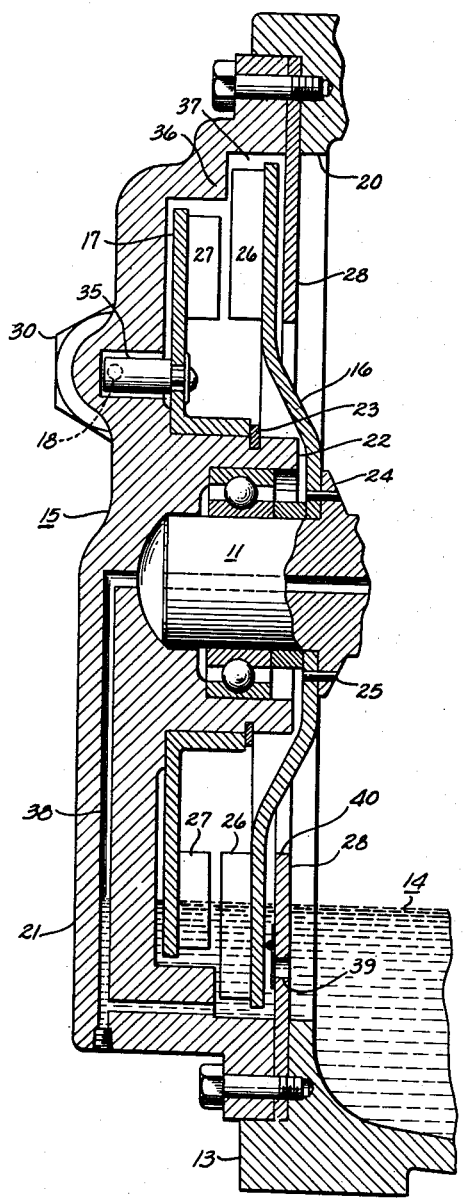
Figure 6 is a fragmentary enlargement showing a modified fluid drive speed responsive device in cross-section.

In the present description, as well as in the accompanying drawings, an air compressor 10 is illustrated as a specific location of the speed responsive actuating device disclosed and claimed herein. This air compressor is equipped with a crank shaft 11 having a pulley 12 on one end thereof. Since the crank shaft and the piston structure, as well as the other structure of the air compressor 10 is well known in the art, the details of this strucure have been omitted. The air compressor 10 is enclosed in a hollow housing 13 having a supporting wall or end plate 21 and an oil reservoir therein for supplying oil to moving parts in the compressor. The liquid shading lines as at 14 in Figure 2 represent the oil in the air compressor 10.

The crank shaft 11 extends through opposite sides of the air compressor 10 with the pulley 12 fastened to one end thereof. The fluid drive speed responsive device 15 for actuating a valve, is located at the other end of the crank shaft. This speed responsive device 15 comprises in general a driving or impelling member 16 and a driven or impelled member 17 coupled by the fluid or oil in the housing 13. The oil indicated by the shading 14 serves as the fluid coupling between the impelling member 16 and the impelled member 17. The impelling member 16 is driven by the crank shaft 11 for rotation therewith and moves the impelled member 17 which is angularly movable relative to the housing 13. A connecting link 18 journalled or otherwise fastened to the impelled member 17 at a distance from the center thereof transfers angular movement of the impelled member to a valve or other control device.

In this specific structure disclosed herein and best illustrated in Figures 3 and 4, the housing 13 of the air compressor is provided with a large opening 20 and a cap or end plate 21. The cap or end plate 21 covers this opening 20 and is fastened to the wall of the housing 13 by bolts or other suitable fastening means which will provide an oil-tight seal between the cap and the wall of the housing. The cap or end plate 21 is further provided internally thereof with an internal hub 22 located in the center of the cap. When the air compressor is assembled, the crank shaft 11 is bearinged in this internal hub 22 as indicated in Figure 3. The impelled member 17 is angularly movable on and is carried by this internal hub 22. A snap ring 23 holds the impelled member 17 on the internal hub 22 and permits angular movement of the impelled member 17.

As has been previously described, the impelling member 16 is mounted on the crank shaft 11. In this specific instance, the crank shaft is provided with a shoulder 24 extending thereabout and to which the impelling member 16 may be fastened by rivets 25 or any other suitable fastening means. The impelling member and the impelled member are each provided with a plurality of blades 26 and 27, respectively, which are aligned in close proximity and near the circumference of the respective members. These blades 26 and 27 may be a portion of the respective member or they may be separate pieces fastened to the members 16 or 17. The blades extend at an angle to the surface of their supporting member to increase the driving coupling between the members. For example, rotation of the crank shaft 11 causes impelling member 16 to tend to angularly move the impelled member 17. When the coupling between these members becomes sufficient, the driving force from the impelling member 16 will angularly move the impelled member 17, thus actuating the connecting link 18 for operating a valve or other mechanism. Since the oil or fluid 14 located in the bottom of the housing 13 of the air compressor 10 provides a better coupling between the impelling member 16 and the impelled member 17, it has been found advisable to provide a way for this oil to enter the space between the members.

Although the lubricating oil 14 is used, it is understood that any suitable fluid may be used for increasing this coupling effect and that gases, air or other mediums which will transfer the force of rotation from the impelling member to the impelled member may be used.

Since the crank shaft is located above the level of the oil reservoir in the housing of the air compressor, it has been found advisable to insert a flat ring 28 between the cap or end plate 21 and the housing 13. This flat ring 28 extends into the opening 20 and cooperates with the cap 21 to provide an internal annular track or groove in which the impelling member 16 and the impelled member 17 are positioned. The oil or fluid level in the housing is of sufficient height so that the fluid will flow over this flat ring 28 and enter the groove or track on the bottom as indicated in Figure 3 by the fluid shading lines. When the air compressor is starting and the crank shaft rotates, the blades 26 on the impelling member 16 carry the fluid completely around in this track so that fluid or oil is disposed between all of the blades of the impelling member 16 and all of the blades 27 of the impelled member 17. At first, the fluid will only couple a few of the blades of the two members. However, if the impelling member 16 gains speed, more fluid will be drawn into the track or annular groove, thus providing a greater coupling between the members. When the coupling between the members has reached a predetermined point, the impelled member 17 will be angularly moved to move the connecting link 18.

In Figure 4 of my drawing, the connecting link 18 is illustrated as being used to control the operation of an air relief valve 30. This valve is an ordinary ball type valve with an actuating pin, which in this instance is the connecting link 18, movable to push the ball 31 against the valve seat. The valve has an inlet represented by the tube 32 which is connected directly to the outlet of the air compressor and thus between the air compressor and the storage tank. The valve 30 also has an outlet 33 extending to atmosphere whereby when the ball 31 is unseated, air from the compressor is bled through this valve 30 to atmosphere. In this particular instance, the connecting link 18 has been slidably mounted in a drilled opening 34 in the cap 21. The connecting link 18, as well as this drilled opening 34 extends generally in a line perpendicular to a line drawn through the point of connection of the link to the impelled member 17 and the center of the impelled member 17. The connecting link 18 may be fastened to the impelled member 17 by any suitable means; such for example, as a stud 35 which extends outwardly from the side surface of the impelled member 17 and engages the connecting link 18.

As the ball 31 is seated against the valve seat in the valve 30, air pressure will be built up in the lines between the compressor and the storage tank which pressure is higher than atmospheric pressure. This air pressure will tend to unseat the ball 31, thus tending to angularly move the impelled member 17 against the angular movement established by the impelling member 16. It, therefore, may be reasoned that the actuating device is responsive to pressure in many instances since the coupling between the impelling member and the impelled member must be sufficient to overcome the forces exerted on the impelled member by the connecting link to cause an angular movement of the impelled member.

In Figure 6, there is illustrated in cross-section a modified device. In this modified device, oil is pumped to the bearings of the crank shaft even though there is not enough oil in the reservoir as indicated by the oil lines 14 in Figure 6 to operate the fluid drive speed responsive device 15. In this particular instance, when there is not sufficient supply of oil in the housing 13 of the machine to form an adequate reservoir, the actuating device 15 will not close the valve 30. Thus the compressor will continue to pump air to atmosphere until it is turned off. Although the machine may come up to speed, there is the safety factor of the bearings being lubricated even though the machine will not pump air. The fact that the compressor does not pump air or any other gas or fluid which it is supposed to pump, is an indication to any person that the oil supply in the reservoir 14 is getting low. This specific construction also provides a flow of oil to the bearings and under pressure. In observing the drawing, it is noted that the impelling member 16 has a larger diameter than the impelling member 17. The end cap 21 of the machine is therefore provided with a step or shoulder 36 aligned with the ring 17 to provide a peripheral space in which the impelling member 16 rotates. This peripheral space which extends around the periphery of the impelling member 16 is designated by the reference character 37. A suitable conduit 38 extending from this peripheral space 37 to the end of the crank shaft 11 carries oil or other lubricant to the bearings on the crank shaft 11. The lubricant is forced through the conduit 38 by the centrifugal action of the impelling member 16. It is noted that the flat ring 28 is provided with an opening 39 illustrated in Figure 6 as being below the top surface of the fluid in the reservoir 14. The opening 39 permits oil to flow into the peripheral space 37 even though the top surface level of the oil in the reservoir 14 is below the inside edge 40 of the flat ring 28.

Figure 7:
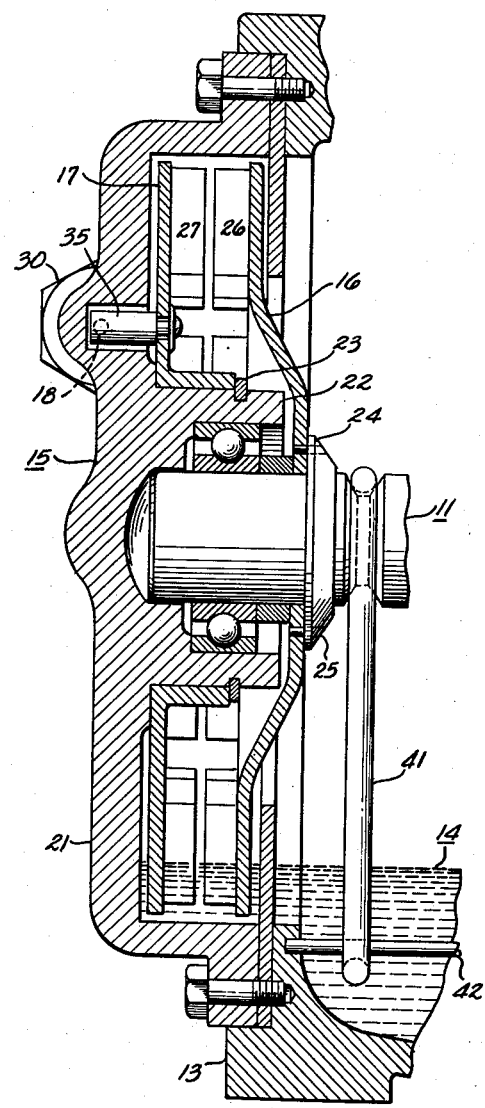
Figure 7 is a fragmentary enlargement showing another modified fluid drive speed responsive device in cross-section.

In Figure 7 of the drawings, an oil carrying ring 41 which is looped over the crank shaft 11 is used to carry oil from the oil reservoir 14 to the crank shaft 11. A rod 42 extending across the bottom of the housing 13 and through the lubricant reservoir 14 is positioned inside this oil carrying ring 41 to insure revolving of the ring 41. When the crank shaft is rotating, oil carried thereto by the ring 41 will be centrifugally driven outwardly along the surface of the crank shaft 11 and outwardly of the impelling member 16, to fill the space around the blades 26 and 27 of the impelling member and the impelled members 16 and 17. After sufficient oil has been worked into this space between the blades of the members 16 and 17, the blades will operate to close the valve 30 in the same manner as described in connection with the structure illustrated in Figure 3.

In each of the devices illustrated and described herein, it is noted that a valve is operated by an impelled member driven through a fluid by an impelling member driven by the crank shaft of the air compressor. Although the description and drawings illustrate a ball valve for opening an air line, it is understood that any type of control device may be operated in place of this ball valve, such, for example, as an electric switch or any type fluid or gaseous valve. As an example of using my control device for other purposes, I have inserted Figure 5. The Figure 5 is very similar to the Figure 4 in that it has the rod 18 operative the same as in Figure 4. However, in Figure 5, this rod 18 bucks a spring 44, which spring 44 normally urges the rod 18 to the right in Figure 5. In this installation, the rod 18 operates a valve, such, for example, as the electric valve or electric switch 45. The spring 44 prevents operation of the valve 45 until the fluid connection between the impelling member 16 and the impelled member 17 has reached a force sufficient to overcome the resilient force of the spring 44.

It is also noted that the device may be used in connection with fluid, as well as gaseous machines, and especially in any operation wherein it is desired to bring the machine up to a certain rotating speed before the valve 30 or other device is operated. The device may very readily be applied to electric motors and similar machines wherein it is desired to operate an electric valve when the rotating part of the electrical machine has reached a predetermined speed. A structure of Figure 5 has the spring 44 to govern the speed at which the rod 18 would be moved to operate the electric valve 45 when the device is used on an electrical machine.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In an air compressor having a reservoir for containing a fluid at the bottom thereof, a crank shaft, an impelling member mounted on said crank shaft and rotatable therewith, an impelled member adjacent to the impelling member and supported for movement by said impelling member, wall means forming an annular space about the impelled member and the impelling member, conveying means extending into said reservoir and carrying fluid to said annular space, and an air valve operably connected to said impelled member.

2. In an air compressor having a reservoir for containing a fluid at the bottom thereof, a crank shaft, an impelling member mounted on said crank shaft and rotatable therewith, an impelled member adjacent to the impelling member and supported for movement by said impelling member, first and second wall means forming an annular space about the impelled member and the impelling member, conveying means extending into said reservoir and carrying fluid to said annular space, and an air valve operably connected to said impelled member, one of said wall means constituting a partition between said annular space and said reservoir, said one of said wall means having an opening communicating with said reservoir to drain fluid from said annular space and into said reservoir.

3. In an air compressor having a reservoir of a fluid in the bottom thereof, a crank shaft, an impelling member mounted on said crank shaft and rotatable therewith, an impelled member adjacent the impelling member and supported for movement by said impelling member, means forming a space about the impelled member and the impelling member, an oil ring looped over said crank shaft and extending into said fluid reservoir to carry fluid to said crank shaft, means conveying said fluid to said space, and an air valve operably connected to said impelled member.

4. In an air compressor having a housing, an end plate having an internal hub, a flat ring between said end plate and said housing and cooperating with said end plate to form an internally opening annular groove thereabouts, a crank shaft bearinged in said hub, an impelling member mounted on said crank shaft and rotatable therewith, an impelled member adjacent the impelling member and supported by said internal hub for angular movement by said impelling member, said members extending in close proximity with each other in said internally opening annular groove, and an air valve operably connected to said impelled member.

5. In an air compressor having a housing, an end plate having an internal hub, a flat ring between said end plate and said housing and cooperating with said end plate to form an internally opening annular groove thereabouts, a crank shaft bearinged in said hub, an impelling member mounted on said crank shaft and rotatable therewith, an impelled member adjacent the impelling member and supported by said internal hub for angular movement by said impelling member, said members extending in close proximity with each other in said internally opening annular groove, a hole in said annular ring extending from said groove to the hollow housing, and an air valve operably connected to said impelled member.

PAUL I. SCHULTZ.

References Cited in the file of this patent

UNITED STATES PATENTS

| Number | Name | Date |
|---|---|---|
| 2,265,675 | Stewart | Dec. 9, 1941 |
| 2,332,372 | Diserens | Oct. 19, 1943 |